Feb. 26, 1946. E. H. WITTENBERG 2,395,602
PRESSURE COOKER
Filed March 16, 1944 2 Sheets-Sheet 1
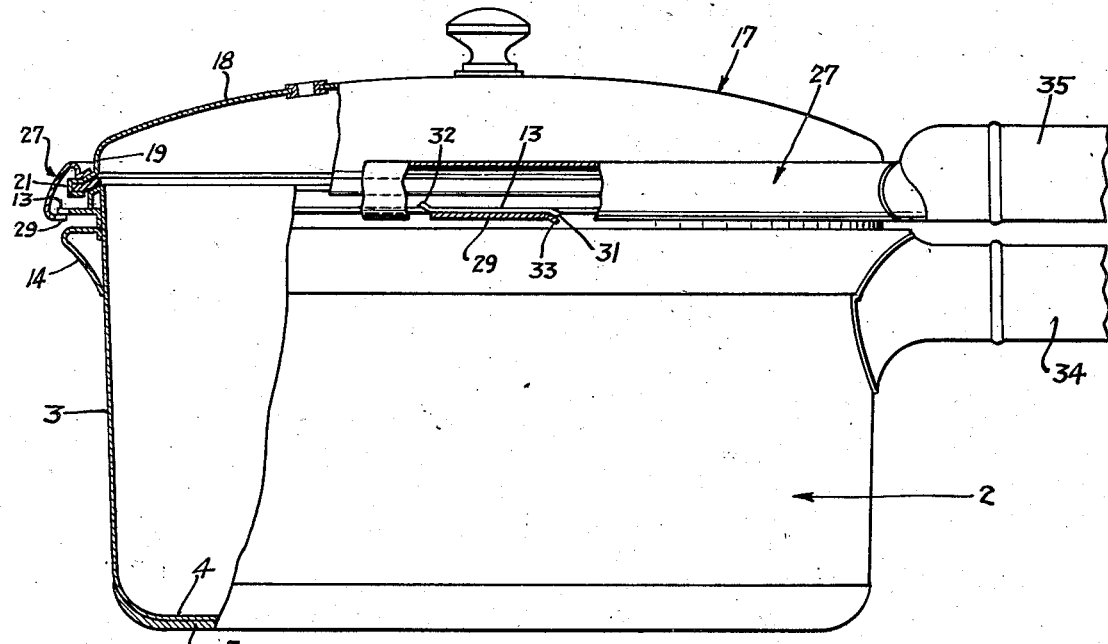
FIG. 1
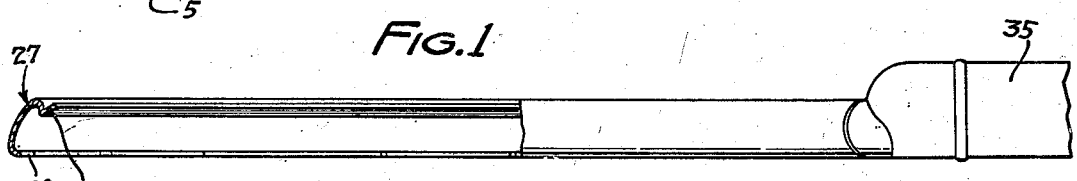
FIG. 2
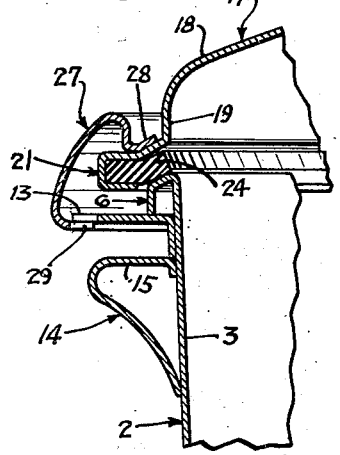
FIG. 3
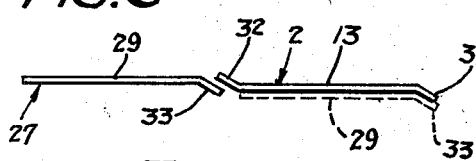
FIG. 7
FIG. 4
INVENTOR
EDWARD H. WITTENBERG
By Paul, Paul & Moore
ATTORNEYS Feb. 26, 1946. E. H. WITTENBERG 2,395,602
PRESSURE COOKER
Filed March 16, 1944 2 Sheets-Sheet 2

INVENTOR
EDWARD H. WITTENBERG
By Paul, Paul & Moore
ATTORNEYS

Patented Feb. 26, 1946

2,395,602

UNITED STATES PATENT OFFICE 2,395,602

PRESSURE COOKER

Edward H. Wittenberg, Eau Claire, Wis., assignor to National Pressure Cooker Company, Eau Claire, Wis., a corporation of Wisconsin Application March 16, 1944, Serial No. 526,672

2 Claims. (Cl. 220—46)

This invention relates to new and useful improvements in pressure cookers of the general character disclosed in my co-pending application, Serial Number 473,316, filed January 23, 1943, now Patent Number 2,368,795 dated February 6, 1945.

The structure disclosed in the present application differs from the one shown in the above mentioned application in that the closure is secured to the cooker body by the application of a lock-ring thereto, and an object of the present invention is to provide such a lock-ring in combination with a cooker body and its closure whereby the closure may be readily and conveniently secured to the cooker body by relative rotation of the lock-ring with respect to the cooker body.

A further object is to provide a pressure cooker of the general character disclosed which readily lends itself for manufacture of sheet metal, the upper portion of the cooker body being formed with an outwardly turned flange to provide an annular seat, and the cover having a sealing element mounted in the lower portion thereof adapted to engage said seat to provide a seal-tight connection between the cooker body and the closure.

A further object is to provide a pressure vessel formed of sheet metal and having an annular flange at its upper portion which extends outwardly and downwardly whereby its lower edge is spaced downwardly from the top of the vessel, and the closure having its marginal edge portion formed with an inwardly facing channel adapted to receive a sealing element whose inner edge portion is unsupported whereby said edge portion may flex when engaged with said seat, and a lock-ring being detachably engaged with the closure and having means at its lower portion adapted to interlock with means on the upper portion of the cooker body vessel by relatively rotating the lock-ring with respect to the cooker body, thereby to secure the closure to the cooker body in leak-tight relation.

Other objects of the invention reside in the simple and inexpensive construction of the lock-ring; in the means provided on the cooker body adapted to interlock with the lock-ring to secure the closure to the cooker body; in the provision of a pressure cooker constructed of sheet metal and having its bottom reinforced by the application thereto of a suitable heat conducting metal which in addition to strengthening the bottom of the cooker also serves to uniformly distribute the heat over the entire bottom thereof; and in the provision of such an apparatus which is strong and durable and readily lends itself to manufacture in quantity production at low cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side view of my improved pressure cooker partially in section to show the general construction thereof;

Figure 2 is a side view of the lock-ring removed from the cooker, partially in section;

Figure 3 is an enlarged detail sectional view showing the closure in sealing engagement with the cooker body and retained in such position by the lock-ring;

Figure 4 is a detail sectional view illustrating the parts shown in Figure 5, slightly separated from one another to more clearly illustrate the construction thereof;

Figure 7 is a fragmentary view illustrating the preferred shape of the inter-engaging lugs of the cooker body and lock-ring;

Figure 5:
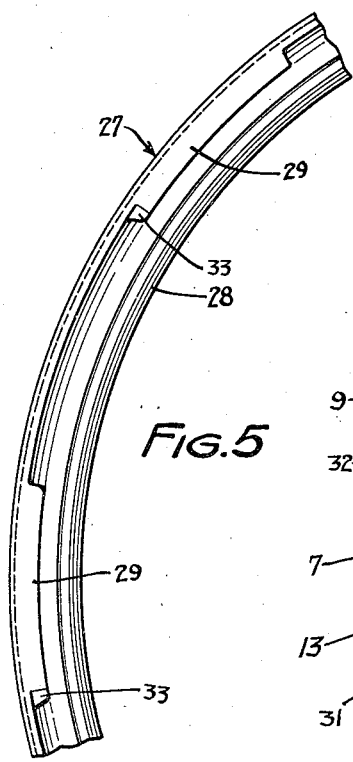
Figure 5 is a bottom view of a portion of the lock-ring showing the lugs provided thereon adapted to interlock with lugs on the cooker body.

The novel pressure cooker herein disclosed is shown comprising a body portion 2 having an upright wall 3 and a bottom wall 4 which preferably is reinforced by the application thereto of a suitable metallic reinforcing element 5, which is preferably of heat conducting metal whereby in addition to strengthening the bottom wall 4, it also serves to uniformly distribute the heat over the entire bottom of the cooker when in use.

The upper end of the cooker body is formed with an outwardly turned flange generally designated by the numeral 6. This flange, as best shown in Figure 4, comprises a downwardly inclined face 7 which serves as a seat, and a cylindrical portion 8 the lower end of which is spaced downwardly from the uppermost end of the cooker body as clearly shown in Figure 4.

Figure 6:
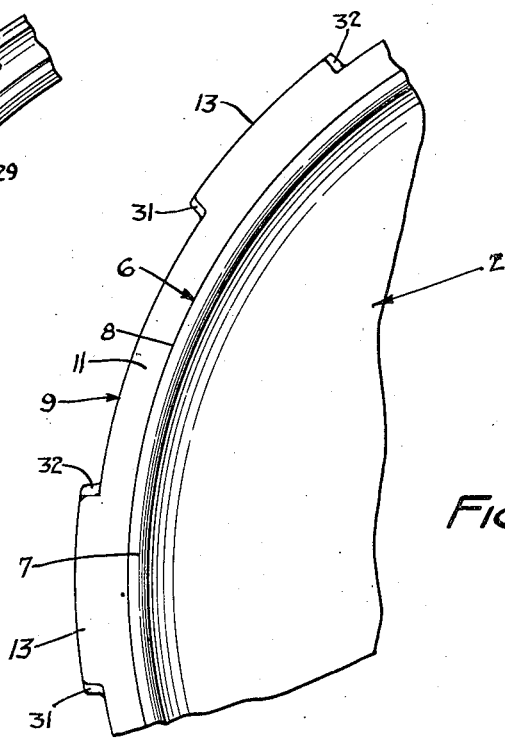
Figure 6 is a plan view of a portion of the upper end of the cooker body showing the annular seat provided thereon and also the outwardly extending lugs adapted to be engaged by the lock-ring.

An annular member generally designated by the numeral 9, is secured to the body of the cooker and comprises a horizontally disposed flange 11 and a vertical flange 12. The flange 12 is seated against the wall 3 of the cooker body and is permanently secured thereto by suitable means applicable for the purpose. The annular member 9 is thus of angle iron cross-section and cooperates with the flange 6 to greatly strengthen the upper end of the cooker body 2 in a horizontal direction. A plurality of outwardly projecting circumferentially spaced lugs 13 are provided on the periphery of the horizontal flange 11, as best shown in Figure 6.

An auxiliary annular reinforced member 14 is also secured to the upright wall 3 of the cooker body and preferably has its upper wall portion 15 abuttingly engaged with the bottom edge of the vertical flange 12 of the member 9. The lower edge portion 16 of the member 14 is seated against the wall 3 of the cooker body and permanently secured thereto.

The member 14 serves as a protecting member for the spaced lugs 13 of the flange 11 to prevent distortion thereof which may result from rough handling of the cooker. In addition, the member 14 greatly enhances the appearance of the cooker body and gives it the appearance of being cast or molded.

The closure for the cooker body, generally designated by the numeral 17, comprises an upper dome shaped wall 18 which merges into a cylindrical wall portion 19 adjacent the periphery of the closure. The closure, like the body 2 of the pressure cooker, is formed of sheet metal and its marginal edge portion is bent outwardly, downwardly and inwardly to provide an inwardly facing channel generally designated by the numeral 21. The channel 21 comprises horizontally disposed wall portions 22 and 23 between which a suitable yieldable sealing element 24 may be received, as clearly illustraed in Figures 3 and 4.

By reference to Figures 3 and 4 it will be noted that the inner marginal edge portion of the sealing element 24 extends beyond the walls 22 and 23 of the channel 21 whereby the inner marginal edge portion of the sealing element or gasket is unsupported.

The diameter of the inner edge 25 of the bottom wall 23 of the channel is slightly larger than the outer diameter of the cylindrical wall portion of the flange 6 whereby when the closure is fitted onto the cooker body and the gasket 24 engages the annular seat 7, the edge 25 may engage the wall portion 8 of the flange 6 and thereby guide the cover axially into place on the cooker body so that the gasket will uniformly engage the seat 7 around its entire circumference.

It will be noted by reference to Figures 3 and 4 that the upper horizontal wall 22 of the channel 21 is connected to the cylindrical wall portion 19 of the closure by an inclined wall portion 26. The inclination of the wall 26 is such that the inner edge portion of the sealing element 24 may freely flex in an upward direction when the closure is seated on the cooker body, as will readily be understood by reference to Figure 3.

Another important feature of the invention resides in the means provided for securing the closure 17 to the cooker body 2 in leak-tight relation.

The means provided for thus detachably securing the closure to the cooker body is shown comprising an annular lock-ring, generally designated by the numeral 27. The upper portion of the lock-ring is shown formed with an inwardly and upwardly extending flange 28 adapted to seat against the inclined wall portion 26 of the closure, as shown in Figure 3. The lower marginal edge portion of the lock-ring is bent inwardly and is formed with a plurality of circumferentially spaced lugs 29 adapted to engage beneath the lugs 13 of the cooker body, as shown in Figure 3, thereby to detachably secure the closure to the cooker body in leak-tight relation.

The spacing between the lugs 13—13 of the cooker body is relatively greater than the overall length of the lugs 29 on the lock-ring, and, in like manner, the spacing between the lugs 29 of the lock-ring is relatively greater than the over-all length of the cooker body lugs. Thus the lugs 29 of the lock-ring may readily be passed between the lugs of the cooker body in the operation of securing the closure to the cooker body, or removing it therefrom. One end of each cooker body lug 13 is preferably bent downwardly as indicated at 31 in Figure 7, and its opposite end 32 is preferably bent upwardly as shown.

In like manner, the leading end 33 of each lug on the lock-ring 27 is preferably bent downwardly whereby the adjacent faces of the lugs 32 and 33 of the cooker body and lock-ring, respectively, may cooperate to provide cam surfaces to readily cam the lock-ring downwardly, when relatively rotated with respect to the cooker body, as will readily be understood by reference to Figure 7. The downwardly turned ends 31 of the lugs 13 of the cooker body may also serve to provide a limit stop for the relative rotation of the lock-ring 27 with respect to the cooker body, as indicated in dotted lines in Figure 7.

In the structure illustrated in Figures 1 to 7, inclusive, the cooker body 3 is shown provided with a suitable handle 34, and the lock-ring 27 has a handle 35. The handles 34 and 35 are so arranged with respect to the lugs 13 and 29 of the cooker body and lock-ring, respectively, that when the lock-ring is fully engaged with the lugs 13 of the cooker body, the handles 34 and 35 are disposed one directly over the other. While this particular arrangement is not essential it is highly desirable in that it clearly indicates when the lugs are in full locking engagement with one another.

Figure 8:
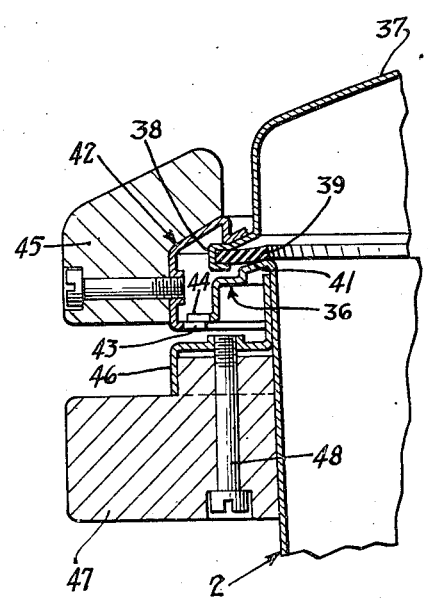
Figure 8 is a detail sectional view substantially on the line 8—8 of Figure 9, showing an apparatus of slightly different construction.
Figure 9:
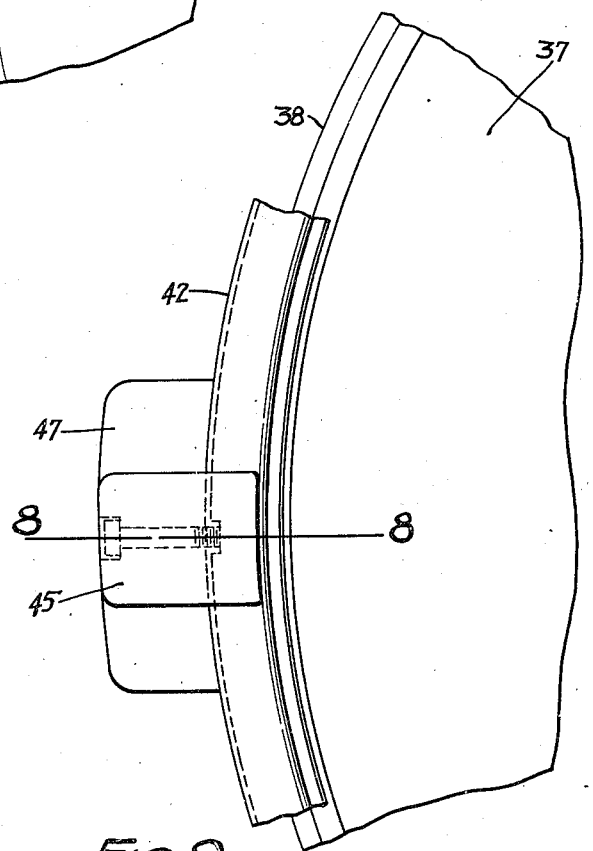
Figure 9 is a top view of Figure 8.

In Figures 8 and 9 there is shown a structure of slightly modified construction wherein the cooker body 2 is provided at its upper end with an outwardly and downwardly turned flange, generally designated by the numeral 36. The flange 36 shown in Figure 8, is very similar to the corresponding flange shown on the cooker illustrated in my pending application hereinbefore mentioned.

The closure 37 has an inwardly facing channel 38 at its bottom adapted to receive a gasket 39 which seats upon the upper inclined face 41 of the flange 36.

A lock-ring, generally designated by the numeral 42, is engaged with the cover and has inwardly projecting lugs 43 adapted to interlock with outwardly projecting lugs 44 provided on the flange 36 of the cooker body, in a manner similar to the lugs 13 and 29 shown in Figure 3. Suitable hand grips 45 are secured to the lock-ring 42 to facilitate its manipulation in the operation of securing the cover to the cooker body and releasing it therefrom.

A suitable reinforcing member 46 is secured to the cooker body in a manner similar to the one shown in my pending application. Suitable lifting handles 47 are shown secured to the member 46 by bolts 48.

The structure illustrated in Figures 8 and 9 is particularly applicable for use on larger size pressure cookers which require lifting handles at opposite sides of the cooker body to facilitate conveniently lifting the cooker from one place to another.

The lock-rings 27 and 42 herein disclosed, and the lugs provided thereon which interlock with the lugs on their respective cooker bodies are so designed and proportioned as to exert but a slight downward pressure on the gasket, when the cover is seated on the cooker body and the lock-ring is moved into locking engagement with the cooker body. In other words, it is only necessary to exert sufficient downward pressure on the gasket to cause it to uniformly engage its seat around the circumference thereof whereby an initial seal is provided between the gasket and its seat which will prevent leakage when pressure initially begins to develop within the cooker body. As the pressure increases within the cooker body the gasket is forced firmly onto its seat by internal pressure in the cooker body, as will readily be understood by reference to Figures 3 and 8, whereby the greater the pressure within the cooker body, the tighter the gasket will be forced into sealing engagement with its seat.

A suitable pressure gauge and safety release valve, not shown, may be provided on the closure as is well known in the art.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

What I claim is:

1. A pressure cooker comprising a body formed of sheet metal and provided at its upper end with an outwardly directed wall portion forming an annular seat and a downwardly directed cylindrical wall portion spaced radially outwardly from the main wall of the cooker body, and an annular member of angle iron cross section fitted onto and secured to the cooker body and having an upper outwardly extending horizontal flange seated against the bottom edge of said cylindrical wall portion, a plurality of outwardly directed circumferentially spaced lugs on the periphery of said horizontal flange, a closure formed of sheet metal and provided at its periphery with an inwardly facing channel having upper and lower spaced walls, a sealing element seated in said channel and having its inner marginal edge portion projecting radially inwardly from the channel and adapted to engage said annular seat, a lock-ring having upper and lower spaced wall portions, upper wall portion being adapted to engage the upper wall of said channel and the lower wall portion of the lock-ring being formed with a plurality of inwardly projecting circumferentially spaced lugs adapted for interlocking engagement with the lugs on the horizontal flange secured to the cooker body by relative rotation of the lock-ring with respect to the cooker body, thereby to secure the closure to the cooker body.

2. A pressure cooker comprising a body formed of sheet metal and provided at its upper end with an outwardly directed wall portion forming an annular seat and a downwardly directed cylindrical wall portion spaced outwardly from the main wall of the cooker body, an annular member of L-shaped cross section fitted onto and secured to the cooker body and having an outwardly extending horizontal flange seated against the bottom edge of said cylindrical wall portion, a plurality of outwardly directed circumferentially spaced lugs on the periphery of said horizontal flange, a closure formed of sheet metal and provided at its periphery with an inwardly facing channel having upper and lower spaced walls, a sealing element seated in said channel and having its inner marginal edge portion projecting radially inwardly from the channel and adapted to engage said annular seat, a lock-ring formed of sheet metal and having an upper wall portion adapted to engage the upper wall of said channel, the lower portion of the lock-ring being formed with a plurality of radially inwardly projecting circumferentially spaced lugs adapted for interlocking engagement with the lugs on the horizontal flange, and a handle on the lock-ring whereby said ring may be rotated relatively to the cooker body to move its lugs into or out of interlocking engagement with the lugs on the horizontal flange in the operation of securing the cover to the cooker body or releasing it therefrom.

EDWARD H. WITTENBERG.